US011936143B2

(12) United States Patent
Bredbeck et al.

(10) Patent No.: US 11,936,143 B2
(45) Date of Patent: Mar. 19, 2024

(54) DIAGNOSIS PLUG-IN CONNECTION, DIAGNOSIS HEAD, AND DIAGNOSIS SYSTEM

(71) Applicant: Rosenberger Hochfrequenztechnik GmbH & Co. KG, Fridolfing (DE)

(72) Inventors: Till Bredbeck, Siegsdorf (DE); Christian Anfang, Bergen (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 7 days.

(21) Appl. No.: 17/619,985

(22) PCT Filed: Jun. 22, 2020

(86) PCT No.: PCT/EP2020/067383
§ 371 (c)(1),
(2) Date: Dec. 16, 2021

(87) PCT Pub. No.: WO2020/260215
PCT Pub. Date: Dec. 30, 2020

(65) Prior Publication Data
US 2022/0360027 A1   Nov. 10, 2022

(30) Foreign Application Priority Data
Jun. 24, 2019 (DE) .................... 20 2019 103 485.8
Sep. 19, 2019 (DE) .................... 10 2019 125 267.9

(51) Int. Cl.
*H01R 13/66* (2006.01)
(52) U.S. Cl.
CPC ..... *H01R 13/6683* (2013.01); *H01R 2201/20* (2013.01)

(58) Field of Classification Search
CPC . H01R 31/08; H01R 13/6683; H01R 2201/20
(Continued)

(56) References Cited

U.S. PATENT DOCUMENTS

| 7,416,443 B2 | 8/2008 | Weiss |
| 8,753,147 B2 * | 6/2014 | Montena ............. H01R 25/003 439/502 |

(Continued)

FOREIGN PATENT DOCUMENTS

| CN | 2689535 Y | 3/2005 |
| CN | 101834354 A | 9/2010 |

(Continued)

OTHER PUBLICATIONS

German Office Action dated Feb. 17, 2020.
International Search Report dated Sep. 21, 2020.
Chinese Patent Office Action dated Aug. 3, 2023.

*Primary Examiner* — Gary F Paumen
(74) *Attorney, Agent, or Firm* — Randall Danskin P.S.

(57) ABSTRACT

A diagnosis plug-in connection comprising an electrical plug connector and a mating electrical plug connector. The electrical plug connector comprises a diagnosis module with an outer conductor contact and an inner conductor contact within the outer conductor contact. The mating plug connector comprises a diagnosis head with an electrically conductive spring cage, which is designed for electrical and mechanical connection to the outer conductor contact of the diagnosis module of the plug connector. The spring cage electrically and mechanically contacts the inner conductor contact of the diagnosis module of the plug connector when the plug connector is plugged together with the mating plug connector.

24 Claims, 8 Drawing Sheets

(58) Field of Classification Search
USPC .......................................... 439/507, 511, 513
See application file for complete search history.

(56) References Cited

U.S. PATENT DOCUMENTS

| | | | |
|---|---|---|---|
| 8,758,050 B2* | 6/2014 | Montena | ............. H01R 13/622 |
| | | | 439/578 |
| 9,423,481 B2 | 8/2016 | Hechtfischer | |
| 10,411,381 B2* | 9/2019 | Plested | ................. H01R 43/16 |
| 10,608,392 B2* | 3/2020 | Duan | ................. H01R 13/6588 |
| 2012/0315788 A1 | 12/2012 | Montena | |
| 2017/0205457 A1 | 7/2017 | Eriksen | |
| 2019/0157823 A1 | 5/2019 | Duan | |

FOREIGN PATENT DOCUMENTS

| | | |
|---|---|---|
| CN | 207265365 U | 4/2018 |
| EP | 0869584 A1 | 10/1998 |
| EP | 1378971 A1 | 11/2002 |
| EP | 3297098 A1 | 3/2018 |
| GB | 2066588 A | 7/1981 |
| JP | 2004288420 A | 10/2004 |

\* cited by examiner

DIAGNOSIS PLUG-IN CONNECTION, DIAGNOSIS HEAD, AND DIAGNOSIS SYSTEM

CROSS-REFERENCE TO RELATED APPLICATIONS

This US National Stage Utility Patent Application claims priority to earlier filed PCT Patent Application No. PCT/EP2020/067383 which was fled on Jun. 22, 2020 and published as WO 2020260215 A1 on Dec. 30, 2020; and further claims priority to earlier filed German Patent Application No. 10 2019 125 267.9 which was filed on Sep. 19, 2019; and sill further claims priority to earlier filed German Utility Model Application No. 20 2019 103 485.8 which was filed on Jun. 24, 2019. The entire contents of the aforementioned PCT Patent Application, the German Patent Application. and the German Utility Model Application are as expressly and fully incorporated herein by this reference.

Pursuant to USPTO rules, this priority claim to PCT Patent Application No. PCT/EP2020/067383 which was filed on Jun. 22, 2020 and published as WO 2020/260215 A1 on Dec. 30, 2020; and to earlier filed German Patent Application No. 10 2019 125 267.9 which was filed on Sep. 19, 2019; and to earlier filed German Utility Model Application No. 20 2019 103 485.8 which was fled on Jun. 24, 2019, is also included in the Application Data Sheet (ADS) fled herewith.

TECHNICAL FIELD

The invention relates to a diagnosis plug-in connection comprising an electrical plug connector and an electrical mating plug connector.

The invention also relates to a mating plug connector for connection to a plug connector.

The invention further relates to a diagnosis head for a mating plug connector, a method for producing a diagnosis head for a diagnosis plug-in connection, and a use of a diagnosis plug-in connection.

The invention additionally also relates to a diagnosis system comprising a control unit and a diagnosis plug-in connection.

The invention also relates furthermore to a method for diagnosing an electrical plug-in connection comprising an electrical plug connector and an electrical mating plug connector.

BACKGROUND

Plug connectors are used to establish an electrical connection with a corresponding complementary mating plug connector. A plug connector or mating plug connector can be a plug, a socket, a coupling or an adapter. The designation "plug connector" or "mating plug connector" used in the context of the invention is representative of all variants.

Connectors or mating plug connectors, of a modular design in particular, often have an outer housing shell into which individual contact assemblies can be inserted. The contact assemblies can, for example, each have an outer conductor contact and an inner conductor contact running within the outer conductor contact and be connected to corresponding conductors of an electrical cable.

To ensure a low-resistance and vibration-proof, or mechanically stable electrical connection, the outer conductor contacts of the plug connector or mating plug connector in the prior art are often formed as a spring cage with a plurality of spring tabs.

In particular, plug-in connections for the automotive industry or for vehicles must meet high requirements in terms of robustness and safety. In particular, a plug-in connection must be closed in a defined manner so that the electrical connection is not disconnected unintentionally, for example during operation of a vehicle. In the autonomous operation of vehicles and for driver assistance systems in particular, ensuring safety is a priority.

Sometimes, when a vehicle is operated autonomously or assistance systems are used, large amounts of data from several cameras, various sensors and navigation sources have to be combined and transported, usually in real time. Accordingly, the operation of many devices, screens and cameras requires a high-performance infrastructure in the vehicle electronics. The electrical requirements for the plug connectors and cable connections within a vehicle are thus now very high in terms of the required data rate.

Another requirement of plug connectors for the automotive industry is that they should be able to be assembled easily and reliably. Particularly during initial assembly of an electrical system, for example in a vehicle, it must be reliably ensured that the plug-in connection is correctly closed or mated.

Such a test can be performed mechanically, for example, by a manual tensile test. However, such a test is comparatively error-prone. Furthermore, it is also not possible to reliably determine in this way whether, in addition to the mechanical connection, the electrical connection also exists in a sufficient manner.

An electrical connection test may thus be required to test the electrical connection between a plug connector and a mating plug connector, especially for safety-critical and/or very complex systems.

In this respect, it is known in high-frequency technology and in particular for coaxial connection systems to incorporate a coil between the inner conductor of an electrical cable and the outer conductor of an electrical cable or alternatively between an inner conductor contact and an outer conductor contact of the plug connector/mating plug connector. The inductance of the coil can be dimensioned here in such a way that it behaves neutrally or with high impedance during the transmission of high-frequency signals, but forms a short circuit with regard to low-frequency test signals (in particular DC signals). This means that a low-frequency continuity test can be carried out between the inner conductor contact and outer conductor contact to check that the plug-in connection is correctly closed.

However, such cables and connectors are comparatively complex to produce and are therefore expensive.

Provided that the housing shell of the plug connector or mating plug connector has a free slot, it can be an alternative to provide a diagnosis assembly in the plug connector which, in addition to the actual signal contact assemblies, is connected to a corresponding mating part, referred to in the context of the invention as a diagnosis head, when the plug-in connection is closed. For this purpose, it is known to connect the diagnosis head to a specially prepared test cable in which a short circuit between the two conductors (outer and inner conductor) has been created by cutting the cable in the cable outlet and soldering the outer conductor and inner conductor.

However, the assembly of the test cable is complex and again causes additional costs.

In view of the known prior art, the object of the present invention is to provide an advantageous diagnosis plug-in connection for which an electrical connection between a plug connector and a mating plug connector can be checked, in particular by technically simple measures.

The present invention is also based on the object of providing an advantageous mating plug connector for which correct connection to a plug connector can be checked by technically simple measures.

Lastly, it is also an object of the invention to provide an advantageous diagnosis head for a mating plug connector and a method for producing a diagnosis head for a diagnosis plug-in connection.

It is also an object of the invention to provide an advantageous use of a diagnosis plug-in connection.

Furthermore, it is an object of the invention to provide a diagnosis system and a method for diagnosing an electrical plug-in connection, by means of which an electrical connection between a plug connector and a mating plug connector can be checked, in particular by technically simple measures.

This disclosure, the drawings, the claims and the features described herein relate to advantageous embodiments and variants of the invention.

A diagnosis plug-in connection is provided, comprising an electrical plug connector and an electrical mating plug connector. The electrical plug connector has a diagnosis assembly with an outer conductor contact and with an inner conductor contact guided within the outer conductor contact. The mating plug connector has a diagnosis head with an electrically conductive spring cage designed for electrical and mechanical connection to the outer conductor contact of the diagnosis assembly of the plug connector.

According to the invention, the spring cage is designed to additionally electrically and mechanically contact the inner conductor contact of the diagnosis assembly of the plug connector when the plug connector is mated with the mating plug connector.

In particular, the spring cage can be suitably shaped (or reshaped) so that, in the case of a mated diagnosis plug-in connection, it simultaneously contacts the outer conductor contact and the inner conductor contact.

Advantageously, the use of the diagnosis head means that there is no need for a pre-assembled test cable. On the one hand, this can save material costs in the production of the diagnosis plug-in connection and, on the other hand, can reduce the cycle time for the assembly of the diagnosis plug-in connection, since only the diagnosis head has to be provided.

The diagnosis assembly, in particular the outer conductor contact and/or the inner conductor contact, preferably has a round cross-section. However, another cross-section can also be provided, for example only, but not limited to, a rectangular cross-section.

The diagnosis head, in particular the spring cage, preferably has a round cross-section. However, another cross-section can also be provided, for example only, but not limited to, a rectangular cross-section.

In an advantageous refinement of the invention, it can be provided that the spring cage is configured to provide a low-resistance electrical connection between the outer conductor contact and the inner conductor contact of the diagnosis assembly when the plug connector is mated with the mating plug connector.

Thus, a short circuit between the inner conductor contact and the outer conductor contact of the diagnosis assembly of the plug connector can be advantageously generated by the spring cage of the diagnosis head when the plug connector is mated with the mating plug connector. In this way, a diagnosis current can flow between the two conductors when the diagnosis plug-in connection is mated. As a result, the state of the diagnosis plug-in connection can be determined by a simple continuity test between the inner conductor contact and the outer conductor contact of the plug connector.

Preferably, the line resistance of the low-impedance connection between the inner conductor contact and the outer conductor contact of the diagnosis assembly in the case of the closed diagnosis plug-in connection is, for example, only 1 ohm or less. The lowest possible connection resistance is preferable.

According to a further refinement of the invention, it can be provided that the inner conductor contact of the diagnosis assembly is guided coaxially within the outer conductor contact.

The diagnosis plug-in connection can preferably be designed as a coaxial connection system. In principle, however, the invention can also be suitable for non-coaxial connectors, for example differential plug-in connections that have one, two or even more inner conductor contacts.

If more than one inner conductor contact is provided, one inner conductor contact, two inner conductor contacts or even more inner conductor contacts can be short-circuited to each other and/or to the outer conductor contact by means of the spring cage.

According to a refinement of the invention, it can be provided that the spring cage is formed from a stamped and bent part.

In an advantageous manner, a conventional spring cage can be manipulated (for example, cut and/or reshaped) in such a way that it is suitable as a diagnosis head within the scope of the invention. In this case, the diagnosis head is also already advantageously suitable for accommodation in a corresponding chamber of an outer housing of the mating plug connector, since it already has the necessary latching means, for example a latching groove.

In a refinement of the invention, it can be provided that the spring cage has a plurality of spring tabs arranged about a center axis of the diagnosis head, each spring tab having a front end (facing the electrical plug connector) and/or a rear end (facing away from the electrical plug connector) immovably attached to the spring cage.

A spring tab (also known as a contact tab) can be a component that can be deformed sufficiently elastically in use or is partially elastic at least in the region of an intended contact point. The spring tabs can, for example, be designed as bending springs, in particular leaf springs. Preferably, the spring tabs can move within a predetermined deflection range starting from a basic position, wherein the spring force attempts to move the spring tabs back to the basic position when they are deflected from the basic position.

The spring tabs and the spring cage are preferably fully conductive and for this purpose are made of metal, for example. Any suitable metals and alloys, for example comprising or consisting of silver, copper, gold, aluminum, bronze or alloys formed therefrom, can be provided for forming the spring cage and in particular the spring tabs.

The spring tabs are preferably oriented in the axial direction with respect to the center axis of the diagnosis head. In particular, the spring tabs can be formed by two parallel longitudinal slots in the main body of the spring cage.

The contact points of the spring tabs (in particular the contact points with the outer conductor contact and/or the inner conductor contact) can have contact domes, bulges or angular deflections to improve contact with the diagnosis assembly.

Preferably, the spring tabs can be evenly distributed along the circumference of the spring cage. In particular, the distance between the spring tabs can be uniform in the circumferential direction.

In principle, the spring cage can also have only a single spring tab. Where the present description refers to a plurality spring tabs, a person skilled in the art can therefore in principle also provide only a single spring tab. However, this is a special case which is not generally preferred. Preferably, the spring cage has at least two or three spring tabs.

In a refinement of the invention, it can be provided that the spring cage has two to ten spring tabs, in particular three to nine spring tabs, preferably four to eight spring tabs, particularly preferably three spring tabs or six spring tabs.

The use of a corresponding number of spring tabs can be advantageous in principle to improve the guidance of the diagnosis head when mating with the diagnosis assembly. Furthermore, the diagnosis head can be flexibly adjusted with regard to the required mating force (in particular a force/displacement curve) when a plurality of spring tabs are used. The plug-in connection can thus be mated with a particularly low force, for example, wherein an overall high holding force and a low-resistance connection after complete insertion can still be ensured.

In a particularly advantageous refinement of the invention, it can be provided that the spring tabs are each configured to simultaneously contact the outer conductor contact and the inner conductor contact of the diagnosis assembly when the plug connector is mated with the mating plug connector.

In particular, it can be provided that all spring tabs of the spring cage are each designed to contact the outer conductor contact and the inner conductor contact of the diagnosis assembly simultaneously when the plug connector is mated with the mating plug connector. All spring tabs of the spring cage can thus preferably have the same structure or geometry and/or the same orientation with respect to the center axis of the diagnosis head.

If necessary, however, additional spring tabs can also be provided, which contact only the outer conductor contact or only the inner conductor contact in each case.

The spring tabs are preferably formed in one piece with the main body of the spring cage.

According to a further refinement of the invention, it can be provided that the spring tabs are each immovably attached to the spring cage with their rear end facing away from the electrical plug connector and are movable in the direction of the center axis of the diagnosis head with their front end facing the electrical plug connector.

Preferably, the spring cage, the spring tabs and/or the outer conductor contact can be designed in such a way that the outer conductor contact can be inserted into an area between the spring tabs and the spring cage or an inner wall of the spring cage.

In accordance with a refinement of the invention, it can be provided that the spring tabs are curved radially outwards with a central contact portion extending between their front end and their rear end in the mechanically unloaded state of the spring tabs.

The central contact portion of the spring tabs can be designed in particular to make electrical and mechanical contact with the outer conductor contact during insertion of the plug connector into the mating plug connector and/or in the inserted state of the plug connector, preferably in a frictionally engaged manner by mechanically tensioning the spring tabs.

In a refinement of the invention, it can be provided that a radial distance between the central contact portion of the spring tabs and the inner radius of the spring cage in the mechanically unloaded state of the spring tabs is smaller than a wall thickness of the outer conductor contact of the diagnosis assembly.

Advantageously, inserting the outer conductor contact into the diagnosis head can thus mechanically stress the spring tabs in such a way that the front end of the spring tabs is bent in the direction of the center axis of the diagnosis head. The restoring spring force of the spring tabs in their unloaded position can generally already sufficiently fix the outer conductor contact in the diagnosis head.

In a refinement of the invention, it can be provided that the spring tabs and/or the outer conductor contact of the diagnosis assembly are designed in such a way that insertion of the outer conductor contact mechanically loads the spring tabs in such a way that the spring tabs are pressed with their front end in the direction of the center axis of the diagnosis head against the inner conductor contact of the diagnosis assembly and with their middle contact portion on the inside against the outer conductor contact, preferably against the inner wall of the outer conductor contact.

Due to the restoring spring force of the spring tabs, a sufficient holding force can be provided in the diagnosis head for the outer conductor contact on the one hand, and a sufficient holding force can also be applied to the inner conductor contact on the other hand, provided that the front, free end of the spring tabs is pressed against the inner conductor contact.

In particular, by suitably dimensioning the diagnosis head and/or the diagnosis assembly, for example by adapting the radial spacing, the geometry and orientation of the spring tabs and/or the wall thickness of the outer conductor contact, a particularly advantageous spring cage can be provided in order, on the one hand, to create a short circuit between the outer conductor contact and the inner conductor contact and, on the other hand, to fix the outer conductor contact and the inner conductor contact in the diagnosis head in a mechanically stable manner.

In particular, it may be provided that the outer conductor contact is inserted into the diagnosis head until, after reaching a defined axial insertion depth, it penetrates into a gap between the spring cage of the diagnosis head and the spring tabs of the spring cage. An even deeper insertion of the outer conductor contact into the spring cage can then lead to a bending of the spring tabs, in particular in such a way that the front, free end of the spring tabs is bent in the direction of the center axis of the diagnosis head or in the direction of the inner conductor contact in order to mechanically contact the inner conductor contact in the diagnosis head.

It can also be provided that the spring tabs in the spring cage project forward (towards the plug connector) to different extents, whereby the insertion of the diagnosis assembly of the plug connector into the diagnosis head of the mating plug connector can be adjustable according to a defined force/displacement curve.

The use of spring tabs in particular exactly three spring tabs) capable of simultaneously contacting the outer conductor contact and the inner conductor contact of the diagnosis assembly (in particular in accordance with the above embodiments) has proven to be particularly suitable.

However, in an advantageous refinement of the invention, two groups of spring tabs can be provided. The spring tabs of the first group can be configured to contact the outer conductor contact of the diagnosis assembly of the plug connector when the plug connector is mated with the mating plug connector. The spring tabs of the second group can be configured to contact the inner conductor contact of the diagnosis assembly of the plug connector when the plug connector is mated with the mating plug connector.

It should be emphasized that features and variants of the invention relating to a spring cage with the two groups of spring tabs can also be advantageously realized for use with a spring cage with spring tabs capable of simultaneously contacting the outer conductor contact and the inner conductor contact of the diagnosis assembly (provided this is not technically impossible).

The spring tabs of the first group and the second group are preferably formed integrally with the main body of the spring cage.

In particular, the spring tabs of the first group can also have axially offset contact points for contacting the outer conductor contact in order to distribute the insertion force evenly over the "Insertion path".

The fact that the first group of spring tabs and the second group of spring tabs are attached to the same component means that there can be a low contact resistance depending on the material.

Preferably, the radial distance between the spring tabs of the first group is as large as possible in order to be able to establish a stable mechanical contact with the outer conductor contact of the plug connector. The largest possible angular spacing can also improve pre-centering during mating of the plug connector and the mating plug connector.

In a refinement of the invention, the spring tabs of the first group for contacting with the outer conductor contact of the diagnosis assembly of the plug connector may be provided with their front end, with their rear end and/or with a central portion extending between the front end and the rear end curved radially outwards to contact an inner surface of the outer conductor contact of the diagnosis assembly when the plug connector is mated with the mating plug connector.

The outer conductor contact of the diagnosis assembly can preferably be designed as a cylindrical hollow body. The inner diameter of the outer conductor contact can be designed in such a way that the outer conductor contact can be pushed over the spring tab of the diagnosis head when the plug connector is mated with the mating plug connector. In this case, the spring tabs can be pressed radially inward by the outer conductor contact in the direction of the center axis of the diagnosis head. This allows the spring tabs to finally introduce the desired holding force into the plug-in connection.

Preferably, the spring tabs of the first group are attached to the spring cage at their front ends and at their rear ends when they are curved outward to contact the inner surface of the outer conductor contact.

However, in an advantageous further refinement of the invention, the spring tabs of the first group for contacting with the outer conductor contact of the diagnosis assembly of the plug connector can also be provided with their front end, with their rear end and/or with a central portion extending between the front end and the rear end curved radially inwards to contact an outer surface of the outer conductor contact of the diagnosis assembly when the plug connector is mated with the mating plug connector.

In this case, the outer conductor contact of the diagnosis assembly can also preferably be designed as a cylindrical hollow body. However, the outer diameter of the outer conductor contact can then be designed in such a way that the outer conductor contact can be pushed into the spring cage of the diagnosis head when the plug connector is mated with the mating plug connector. In this case, the spring tabs can be pressed radially outward by the outer conductor contact and in turn apply the holding force.

Preferably, the spring tabs of the first group are attached to the spring cage at their rear ends when they are curved inward to contact the outer surface of the outer conductor contact.

In an advantageous refinement of the invention, it can be provided that the spring tabs of the second group for contacting with the inner conductor contact of the diagnosis assembly of the plug connector are curved radially inwards with their front end, with their rear end and/or with a central portion extending between the front end and the rear end in order to contact the inner conductor contact of the diagnosis assembly when the plug connector is mated with the mating plug connector.

The inner conductor contact of the diagnosis assembly can preferably be of an elongate design, particularly preferably in the form of a cylindrical pin contact. The outer diameter of the inner conductor contact can be designed in such a way that the inner conductor contact can be inserted between the inwardly curved spring tabs of the second group in such a way that the inner conductor contact makes electrical contact with the spring tabs of the second group and preferably presses the spring tabs radially outward.

For example, a conventional spring cage or a punch-bend part for a conventional spring cage can be manipulated such that one or more spring tabs, preferably two opposing spring tabs, are separated from the spring cage at their front end or at their rear end and bent radially inward.

In an advantageous refinement of the invention, it can be provided that the front end or the rear end of each of the spring tabs of the second group is bent radially inward in the direction of the center axis of the diagnosis head, and wherein the opposite end of each spring tab is attached to the spring cage.

Preferably, the spring tabs of the second group are thus connected to the spring cage with only one of their two ends.

A mixed attachment of the spring tabs of the second group may also be provided, according to which one or some spring tabs are attached with their front end and one or some spring tabs are attached with their rear end.

In a refinement of the invention, it can be provided that the first group has at least three, preferably four or even more spring tabs.

Particularly preferably, the first group of spring tabs has exactly four spring tabs.

According to a refinement of the invention, it can be provided that the second group has at least one, preferably two or even more spring tabs.

Particularly preferably, the second group of spring tabs has exactly two spring tabs.

Preferably, the spring tabs of the first group and/or the spring tabs of the second group are each formed from individual pairs of spring tabs arranged opposite each other.

In an advantageous refinement of the invention, the plug connector can have at least a first signal contact assembly having an outer conductor contact and having an inner conductor contact element guided within the outer conductor contact. The mating plug connector can have at least a second signal contact assembly having an outer conductor spring contact and having an inner conductor contact element guided within the outer conductor spring contact. The first signal contact assembly and the second signal contact assembly can be mateable with each other for electrical and mechanical contacting. Here, the inner conductor contact and the inner conductor contact element as well as the outer conductor contact with the outer conductor spring cage can each be electrically and mechanically connected to each other.

The signal contact assemblies can thus form the actual signal connection that needs to be established between the plug connector and the mating plug connector.

It should be mentioned that features specified in the context of the spring cage of the diagnosis head can also be transferred to the outer conductor spring cage. In particular, it can be provided that the outer conductor spring cage exclusively has spring tabs which are formed and arranged according to the first group of spring tabs described above.

Furthermore, features relating to the diagnosis module can also be transferred to the first signal module. Preferably, the first signal assembly and the diagnosis assembly are of identical design. This can support a modular design of the diagnosis plug-in connection.

The diagnosis plug-in connection can therefore also form at least one electrical signal connection and/or supply connection in addition to the pure diagnosis connection.

In an advantageous refinement of the invention. It can be provided that the plug connector has two, three, four, five, six, seven, eight or even more first signal contact assemblies and/or the mating plug connector has one, two, three, four, five, six, seven, eight or even more second signal contact assemblies.

The number of first signal contact assemblies and second signal contact assemblies preferably corresponds to each other, but can also differ from each other if necessary, especially in the case of a modular system in which the plug connector and/or the mating plug connector has one or more slots that cannot be occupied due to the application.

Particularly preferably, the plug connector has three first signal contact assemblies and the mating plug connector has three second signal contact assemblies.

In accordance with a refinement of the invention, it can be provided that the plug connector has a first outer housing shell and the mating plug connector has a second outer housing shell with various contact chambers for receiving the diagnosis assembly, the diagnosis head and/or the signal contact assemblies.

Since the diagnosis assembly, the diagnosis head and/or the signal assemblies are preferably part of a modular plug connector system, they can preferably have matching or at least compatible outer geometries, whereby they can be optionally inserted into the first housing shell or the second housing shell.

As a minimum, it can be provided that the contact chambers of the first housing shell are configured to selectively receive one of the first signal contact assemblies or the diagnosis assembly, and the contact chambers of the second housing shell are configured to selectively receive one of the second signal contact assemblies or the diagnosis head.

The housing shell is preferably made of a plastic.

Preferably, the diagnosis assembly, diagnosis head and/or signal assembly latches within the contact chamber of the corresponding housing shell.

Preferably, the housing shells of the plug connector and the mating plug connector are mechanically coded to be interconnectable only in one or more intended orientations and only with a corresponding mating part.

It may also be possible to provide more than one diagnosis module in the diagnosis plug-in connection, for example two, three, four or even more diagnosis modules. A plurality of diagnosis modules can be advantageous, especially for connectors or mating plug connectors with comparatively large dimensions, to ensure that the plug connector is closed completely and correctly. The diagnosis assemblies can then be provided, for example, at the edges, preferably in the corners, of the plug connector or mating plug connector. In the case of a single diagnosis module, on the other hand, it may also be advantageous to arrange the module as centrally as possible within the plug connector or mating plug connector (depending on the availability of a suitable contact chamber).

The invention also relates to a mating plug connector for connection to a plug connector, comprising a diagnosis head having an electrically conductive spring cage configured for electrical and mechanical connection to an outer conductor contact of a diagnosis assembly of the plug connector. The spring cage is designed to additionally electrically and mechanically contact an inner conductor contact of the diagnosis assembly of the plug connector guided within the outer conductor contact when the plug connector is mated with the mating plug connector.

Preferably, the spring cage has one or more spring tabs, preferably three spring tabs, for simultaneous contacting of the outer conductor contact and the inner conductor contact.

The invention additionally relates to a diagnosis head (in particular according to the foregoing and subsequent embodiments) for a mating plug connector (in particular according to the foregoing and subsequent embodiments).

The invention also relates to a method for producing a diagnosis head for a diagnosis plug-in connection. It is provided that a spring cage (hereinafter also referred to as "outer conductor spring cage") of an electrical mating plug connector is stamped out of a metal sheet and shaped into an annular spring cage. Before or after shaping, at least one spring tab of the spring cage is separated from the spring cage at a front end or at a rear end and bent in the direction of the center axis of the spring cage in such a way that the spring cage electrically conductively connects an outer conductor contact and an inner conductor contact of a diagnosis assembly of an electrical plug connector to one another when the plug connector is mated with the mating plug connector.

Furthermore, the invention relates to a use of a diagnosis plug-in connection, in particular according to the foregoing and subsequent embodiments, for a plug connector system according to an HFM, RMC or FAKRA standard.

However, the diagnosis plug-in connection is not limited to use with a specific connector type. The invention may be particularly suitable for connectors and mating plug connectors for high-frequency technology. In particular, the diagnosis plug-in connection may advantageously be used with, for example only, and not limited to PL, BNC, TNC, SMBA (FAKRA), SMA, SMB, SMS, SMC, SMP, BMS. HFM (FAKRA-Mini), H-MTD, BMK, Mini-Coax or MATE-AX connector systems.

The invention may further be well suited for forming an antenna system, according to which the plug connector is connected to a signal processing unit, and according to which the mating plug connector is connected to one or more antennas via one or more cable connections, or itself forms one or more antennas.

The present invention can be used particularly advantageously in a vehicle. The term "vehicle" describes any means of transport, in particular vehicles on land, water or in the air, including space vehicles.

The invention also relates to a diagnosis system comprising a control unit and a diagnosis plug-in connection. The diagnosis plug-in connection comprises an electrical plug connector and an electrical mating plug connector, wherein the electrical plug connector comprises a diagnosis assembly having an outer conductor contact and an inner conductor contact guided within the outer conductor contact. The mating plug connector has a diagnosis head with an electrically conductive spring cage configured to electrically and mechanically connect to the outer conductor contact of the diagnosis assembly of the plug connector. The control unit is designed to perform an electrical continuity test between the outer conductor contact and the inner conductor contact. It is provided that the spring cage of the diagnosis head is designed to contact the inner conductor contact of the diagnosis assembly of the plug connector electrically and mechanically when the plug connector is mated with the mating plug connector.

The control unit can also be part of an electronic system, for example part of a transmitting and receiving unit for a wireless communication system (Bluetooth, WLAN, Zig-Bee, NFC, Wibree, WIMAX, IrDA and others).

The control unit can also be connected to one or more signal contact assemblies of the plug connector in order to control signal transmission via the plug-in connection consisting of plug connector and mating plug connector, in addition to diagnosis.

The control unit can be designed as a microprocessor. Instead of a microprocessor, any other device for implementing the control unit may also be provided, for example one or more arrays of discrete electrical components on a printed circuit board, a programmable logic controller (PLC), an application-specific integrated circuit (ASIC) or any other programmable circuit, for example also a field programmable gate array (FPGA), a programmable logic array (PLA) and/or a commercially conventional computer.

The invention also relates to a method for diagnosing an electrical plug-in connection (also referred to herein as a "diagnosis plug-in connection") comprising an electrical plug connector and an electrical mating plug connector. It is provided to perform an electrical continuity test between an outer conductor contact and an inner conductor contact, guided within the outer conductor contact, of a diagnosis assembly of the plug connector in order to detect whether the electrical plug-in connection is closed. For this purpose. It is provided that the outer conductor contact and the inner conductor contact of the diagnosis assembly of the plug connector are electrically conductively connected to each other via a spring cage of a diagnosis head of the mating plug connector when the plug connector is mated with the mating plug connector.

Preferably, the outer conductor contact and the inner conductor contact are connected to each other by means of spring tabs of the spring cage, wherein at least one spring tab (preferably three spring tabs) establishes a corresponding direct electrical connection between the outer conductor contact and the inner conductor contact.

Lastly, a computer program product having program code means can be provided to perform the above-described method of diagnosing an electrical plug-in connection when the program is run on a control unit of a diagnosis system.

Features that have been described in conjunction with the diagnosis plug-in connection according to the invention can of course also be advantageously implemented for the mating plug connector, the diagnosis head, the method for producing the diagnosis head, the use, the diagnosis system and the method for diagnosing the plug-in connection—and vice versa. Furthermore, advantages already mentioned in conjunction with the diagnosis plug-in connection according to the invention can also be understood as relating to the mating plug connector, the diagnosis head, the method for producing the diagnosis head, the use, the diagnosis system and the method for diagnosing the plug-in connection—and vice versa.

It should also be noted that terms such as "comprising", "having" or "with" do not exclude other or additional features or steps. Furthermore, terms such as "a" or "the" which indicate a singular number of steps or features do not exclude a plurality of features or steps—and vice versa.

In particular, it can be provided that the diagnosis head consists exclusively of the spring cage.

In particular, it can also be provided that the spring cage exclusively has spring tabs that allow simultaneous contacting of the outer conductor contact and the inner conductor contact of the diagnosis assembly.

The diagnosis head or spring cage is preferably not connected or crimped to a cable, as is generally provided in the prior art.

The diagnosis head preferably has no internal conductor contact.

Furthermore, it should be noted that the values and parameters described herein include deviations or fluctuations of ±10% or less, preferably ±5% or less, further preferably ±1% or less, and most preferably ±0.1% or less of the particular designated value or parameter, provided that these deviations are not excluded in the implementation of the invention in practice. The specification of ranges by initial and final values also includes all those values and fractions which are included by the particular designated range, in particular the initial and final values and a corresponding mean value.

Exemplary embodiments of the invention are described in more detail below with reference to the accompanying Figures.

The figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art to form further useful combinations and sub-combinations with features of other exemplary embodiments.

SUMMARY

A diagnosis plug-in connection, diagnosis head, and diagnosis system generally provides an electrical plug connector having a diagnosis assembly that has an outer conductor contact and an inner conductor contact; and an electrical mating plug connector that has a diagnosis head that has an electrically conductive soring cage.

A principal aspect of the present invention is a diagnosis plug-in connection (1) comprising an electrical plug connector (2) and an electrical mating plug connector (3), wherein the electrical plug connector (2) has a diagnosis assembly (13) with an outer conductor contact (9) and with an inner conductor contact (10) guided within the outer conductor contact (9), and wherein the mating plug connector (3) has a diagnosis head (14) with an electrically conductive spring cage (15) which is designed for electrical and mechanical connection to the outer conductor contact (9) of the diagnosis assembly (13) of the plug connector (2), characterized in that the spring cage (15) is designed to additionally contact electrically and mechanically the inner conductor contact (10) of the diagnosis assembly (13) of the plug connector (2) when the plug connector (2) is mated with the mating plug connector (3).

A further aspect of the present invention is a diagnosis plug-in connection (1), characterized in that the spring cage (15) is designed to establish a low-resistance electrical connection between the outer conductor contact (9) and the inner conductor contact (10) of the diagnosis assembly (13) when the plug connector (2) is mated with the mating plug connector (3).

A further aspect of the present invention is a diagnosis plug-in connection (1), characterized in that the inner conductor contact (10) of the diagnosis assembly (13) is guided coaxially within the outer conductor contact (9).

A further aspect of the present invention is a diagnosis plug-in connection (1), characterized in that the spring cage (15) is formed from a punched-and-bent part.

A further aspect of the present invention is a diagnosis plug-in connection (1), characterized in that the soring cage (15) has a plurality of spring tabs (18, 19, 26) arranged around the center axis (M) of the diagnosis head (14), each spring tab (18, 19, 26) having a front end (20) and/or a rear end (21) immovably attached to the spring cage (15).

A further aspect of the present invention is a diagnosis plug-in connection (1), characterized in that the soring cage (15) has two to ten spring tabs (18, 19, 26), in particular three to nine spring tabs (18, 19, 26), preferably four to eight spring tabs (18, 19, 26), particularly preferably three soring tabs (18, 19, 26) or six soring tabs (18, 19, 26).

A further aspect of the present invention is a diagnosis plug-in connection (1), characterized in that the soring tabs (26) are each designed to simultaneously contact the outer conductor contact (9) and the inner conductor contact (10) of the diagnosis assembly (13) when the plug connector (2) is mated with the mating plug connector (3).

A further aspect of the present invention is a diagnosis plug-in connection (1), characterized in that the spring tabs (18, 19, 26) are each immovably attached to the spring cage (15) with their rear end (21) facing away from the electrical plug connector (2) and are movable in the direction of the center axis (M) of the diagnosis head (14) with their front end (20) facing the electrical plug connector (2).

A further aspect of the present invention is a diagnosis plug-in connection (1), characterized in that the spring tabs (26) are curved radially outwards with a central contact portion (27) extending between their front end (20) and their rear end (21) in the mechanically unloaded state of the soring tabs (26).

A further aspect of the present invention is a diagnosis plug-in connection (1), characterized in that a radial distance (D) between the central contact portion (27) of the spring tabs (26) and the inner radius ($r_i$) of the spring cage (15) in the mechanically unloaded state of the spring tabs (26) is smaller than a wall thickness ($D_W$) of the outer conductor contact (9) of the diagnosis assembly (13).

A further aspect of the present invention is a diagnosis plug-In connection (1), characterized in that the soring tabs (26) and/or the outer conductor contact (9) of the diagnosis assembly (13) are designed in such a way that insertion of the outer conductor contact (9) mechanically loads the spring tabs (26) in such a way that the spring tabs (26) are pressed with their front end (20) in the direction of the center axis (M) of the diagnosis head (14) against the inner conductor contact (10) of the diagnosis assembly (13) and with their central contact portion (27) on the inside against the outer conductor contact (9).

A further aspect of the present invention is a diagnosis plug-in connection (1), characterized in that two groups of spring tabs are provided, wherein the spring tabs (18) of the first group are designed to contact the outer conductor contact (9) of the diagnosis assembly (13) of the plug connector (2) when the plug connector (2) is mated with the mating plug connector (3), and wherein the soring tabs (19) of the second group are designed to contact the inner conductor contact (10) of the diagnosis assembly (13) of the plug connector (2) when the plug connector (2) is mated with the mating plug connector (3).

A further aspect of the present invention is a diagnosis plug-in connection (1), characterized in that for contacting with the outer conductor contact (9) of the diagnosis assembly (13) of the plug connector (2), the spring tabs (18) of the first group are curved radially outwards with their front end, with their rear end and/or with a central portion extending between the front end and the rear end to contact an inner surface of the outer conductor contact (9) of the diagnosis assembly (13) when the plug connector (2) is mated with the mating plug connector (3).

A further aspect of the present invention is a diagnosis plug-in connection (1), characterized in that for contacting with the outer conductor contact (9) of the diagnosis assembly (13) of the plug connector (2), the spring tabs (18) of the first group are curved radially inwards with their front end, with their rear end and/or with a central portion extending between the front end and the rear end to contact an outer surface of the outer conductor contact (9) of the diagnosis assembly (13) when the plug connector (2) is mated with the mating plug connector (3).

A further aspect of the present invention is a diagnosis plug-in connection (1), characterized in that for contacting with the inner conductor contact (10) of the diagnosis assembly (13) of the plug connector (2), the spring tabs (19) of the second group are curved radially inwards with their front end (20), with their rear end (21) and/or with a central portion extending between the front end (20) and the rear end (21) to contact the inner conductor contact (10) of the diagnosis assembly (13) when the plug connector (2) is mated with the mating plug connector (3).

A further aspect of the present invention is a diagnosis plug-in connection (1), characterized in that the front end (20), or the rear end (21), of each of the spring tabs (19) of the second group is bent radially inwards in the direction of the center axis (M) of the diagnosis head (14), and wherein the opposite end (20, 21) of each soring tab (19) is connected to the soring cage (15).

A further aspect of the present invention is a diagnosis plug-in connection (1), characterized in that the first group has at least three, preferably four or even more soring tabs (18).

A further aspect of the present invention is a diagnosis plug-in connection (1), characterized in that the second group comprises at least one, preferably two or even more spring tabs (19).

A further aspect of the present invention is a diagnosis plug-in connection (1), characterized in that the plug connector (2) has at least one first signal contact assembly (7) with an outer conductor contact (9) and with an inner conductor contact (10) guided within the outer conductor contact (9) and wherein the mating plug connector (3) has at least one second signal contact assembly (8) with an outer conductor spring cage (11) and with an inner conductor contact element (12) guided within the outer conductor spring cage (11), and wherein the first signal contact assembly (7) and the second signal contact assembly (8) can be mated with each other for electrical and mechanical contacting.

A further aspect of the present invention is a diagnosis plug-in connection (1), characterized in that the plug connector (2) has two, three, four, five, six, seven, eight or even more first signal contact assemblies (7) and/or the mating plug connector (3) has one, two, three, four, five, six, seven, eight or even more second signal contact assemblies (8).

A further aspect of the present invention is a diagnosis plug-in connection (1), characterized in that the plug connector (2) has a first outer housing shell (4) and the mating plug connector (3) has a second outer housing shell (6) with respective contact chambers (5) for receiving the diagnosis assembly (13), the diagnosis head (14) and/or the signal contact assemblies (7, 8).

A further aspect of the present invention is a mating plug connector (3) for connection to a plug connector (2), comprising a diagnosis head (14) with an electrically conductive spring cage (15) which is designed for electrical and mechanical connection to an outer conductor contact (9) of a diagnosis assembly (13) of the plug connector (2), characterized in that the spring cage (15) is designed to additionally electrically and mechanically contact an inner conductor contact (10), guided within the outer conductor contact (9), of the diagnosis assembly (13) of the plug connector (2) when the plug connector (2) is mated with the mating plug connector (3).

A further aspect of the present invention Is a diagnosis head (14) for a mating plug connector (3).

A further aspect of the present invention is a method for producing a diagnosis head (14) for a diagnosis plug-in connection (1), according to which a spring cage (15) of an electrical mating plug connector (3) Is stamped out of a metal sheet and shaped into an annular soring cage (15), characterized in that before or after the shaping, at least one soring tab (18, 19, 26) of the spring cage (15) is separated from the spring cage (15) at a front end (20) or at a rear end (21) and is bent in the direction of the center axis (M) of the spring cage (15) in such a manner that the spring cage (15) electrically conductively connects an outer conductor contact (9) and an inner conductor contact (10) of a diagnosis assembly (13) of an electrical plug connector (2) to each other when the plug connector (2) is mated with the mating plug connector (3).

A further aspect of the present invention is a use of a diagnosis plug-in connection (1) for a plug connector system according to an HFM, RMC or FAKRA standard.

A still further aspect of the present invention is a diagnosis system (22), comprising a control unit (17) and a diagnosis plug-in connection (1), wherein the diagnosis plug-in connection (1) comprises an electrical plug connector (2) and an electrical mating plug connector (3), wherein the electrical plug connector (2) has a diagnosis assembly (13) with an outer conductor contact (9) and with an inner conductor contact (10) guided within the outer conductor contact (9), and wherein the mating plug connector (3) has a diagnosis head (14) with an electrically conductive spring cage (15) which is designed for electrical and mechanical connection to the outer conductor contact (9) of the diagnosis assembly (13) of the plug connector (2), and wherein the control unit (17) is configured to perform an electrical continuity test between the outer conductor contact (9) and the inner conductor contact (10), characterized in that the spring cag (15) of the diagnosis head (14) is configured to electrically and mechanically contact the inner conductor contact (10) of the diagnosis assembly (13) of the plug connector (2) when the plug connector (2) is mated with the mating plug connector (3).

An even still further aspect of the present invention is a method for diagnosing an electrical plug-in connection (1) comprising an electrical plug connector (2) and an electrical mating plug connector (3), according to which an electrical continuity test is performed between an outer conductor contact (9) and an inner conductor contact (10) of a diagnosis assembly (13) of the plug connector (2) guided inside the outer conductor contact (9) to detect whether the electrical plug connector (1) is closed, characterized in that the outer conductor contact (9) and the inner conductor contact (10) of the diagnosis assembly (13) of the plug connector (2) are electrically conductively connected to each other via a spring cage (15) of a diagnosis head (14) of the mating plug connector (3) when the plug connector (2) is mated with the mating plug connector (3).

These and other aspects of the invention are more fully disclosed and described herein as is required by the Statute.

BRIEF DESCRIPTIONS OF THE FIGURES in the Figures, functionally identical elements are provided with the same reference signs.

This disclosure of the invention is submitted in furtherance of the Constitutional purposes of the US Patent Laws "to promote the progress of Science and the useful arts" (Article 1, Section 8).

Figure 1:
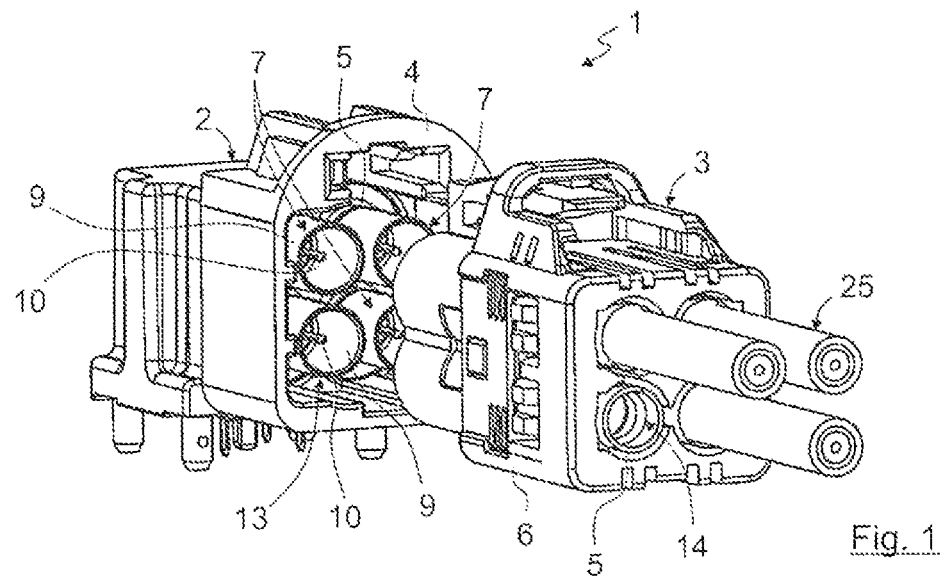
FIG. 1 shows a diagnosis plug-in connection comprising an electrical plug connector and an electrical mating plug connector in a first perspective view.
Figure 2:
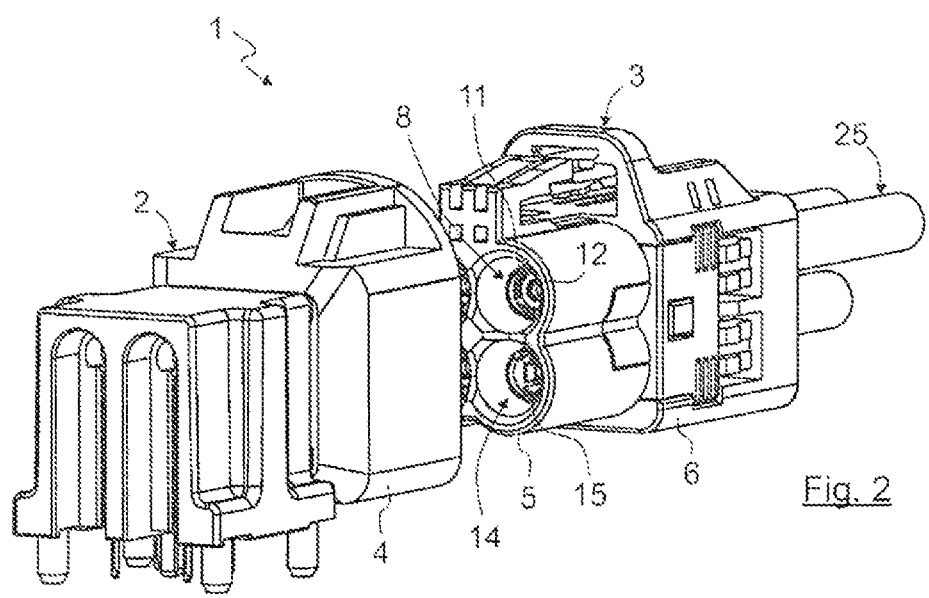
FIG. 2 shows the diagnosis plug-in connection of FIG. 1 in a second perspective view.

FIGS. 1 and 2 show a diagnosis plug-in connection 1 according to the invention from two different perspective views. The diagnosis plug-in connection 1 comprises an electrical plug connector 2 and an electrical mating plug connector 3, which can be mated with the electrical plug connector 2. For this purpose, the plug connector 2 has a first housing shell 4 with contact chambers 5 for receiving contact assemblies 7, 13. The mating plug connector 3 has a corresponding second housing shell 6 with contact chambers 5 for receiving corresponding contact assemblies 8, 14.

According to a preferred embodiment, the diagnosis plug-in connection 1, which is to be understood merely as an example, is designed as a plug connector of the HFM type. In principle, however, the invention can also be suitable for use with another connector standard, for example, but not limited to, an RMC (MATE-X) or FAKRA standard.

By way of example, the plug connector 2 shown in FIGS. 1 and 2 has three first signal contact assemblies 7 and the mating plug connector 3 has three corresponding second signal contact assemblies 8. The first signal contact assemblies 7 each have an outer conductor contact 9 in which respective inner conductor contacts 10 are coaxially guided. The second signal contact assembly 8 of the mating plug connector 3 has an outer conductor spring cage 11 which corresponds to, or can be mated with, the outer conductor contacts 9 of the first signal contact assembly 7 and in which an inner conductor contact element 12 is guided coaxially, which in turn can be connected to the inner conductor contacts 10 of the first signal contact assembly 7.

The electrical plug connector 2 further comprises a diagnosis assembly 13 having an outer conductor contact 9 and having an inner conductor contact 10 guided within the outer conductor contact 9, wherein the diagnosis assembly 13 can be basically analogous to the first signal contact assembly 7, as shown in the exemplary embodiment, which can improve the modularity of the diagnosis plug-in connection 1.

The mating plug connector 3 has a diagnosis head 14 with an at least partially electrically conductive spring cage 15, which is designed for electrical and mechanical connection to the outer conductor contact 9 of the diagnosis assembly 13 of the plug connector 2. The outer conductor spring cage 11 of the second signal contact assembly 8 can in principle be of a similar design to the spring cage 15 of the diagnosis head 14. In particular, an outer conductor spring cage 11 of a second signal contact assembly 8 can be redesigned according to the invention within the scope of a method for producing the diagnosis head 14. In particular, the spring cage 15 of the diagnosis head 14 and the outer conductor spring cage 11 of the second signal contact assembly 8 can be formed from the same stamped-and-bent part or can be produced as part of a common stamping-and-bending process.

The spring cage 15 according to the invention is further configured to electrically and mechanically contact the inner conductor contact 10 of the diagnosis assembly 13 of the plug connector 2, In addition to the outer conductor contact 9, when the plug connector 2 is correctly mated with the mating plug connector 3.

Figure 3:
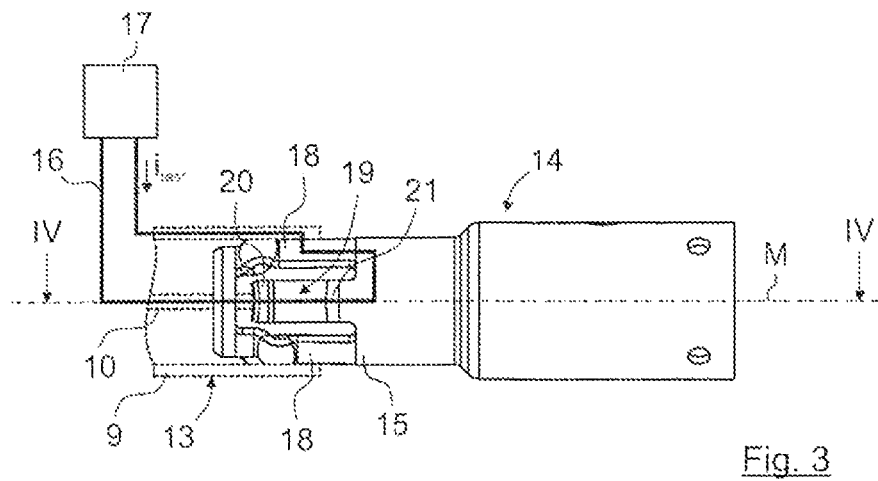
FIG. 3 shows a side view of a diagnosis head according to a first exemplary embodiment.
Figure 4:
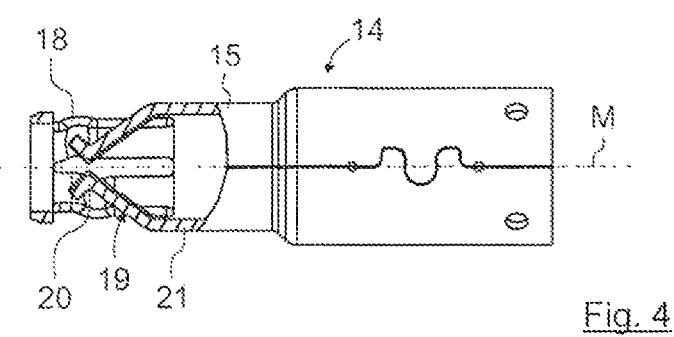
FIG. 4 shows the diagnosis head according to the invention of FIG. 3 in a partially sectional view taken along the line of section IV of FIG. 3.
Figure 5:
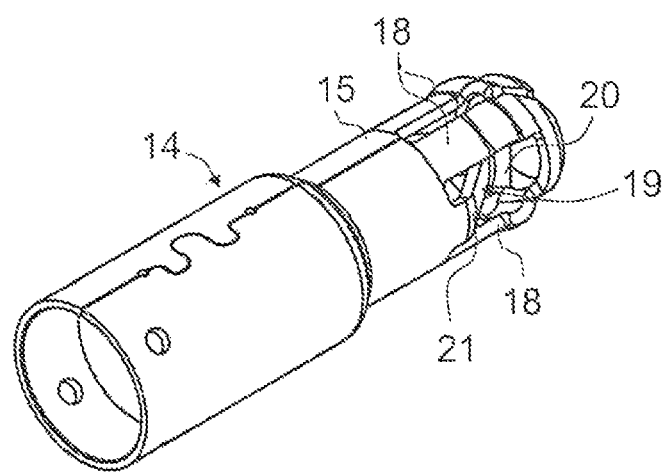
FIG. 5 shows the diagnosis head according to the invention of FIG. 3 in a perspective view.

FIGS. 3 to 6 show a first exemplary embodiment of a diagnosis head 14 according to the invention. In FIG. 3, the diagnosis head 14 is shown in a side view, in FIG. 4 in a partially sectional view taken along line IV of FIG. 3, in FIG. 5 in a perspective view and in FIG. 6 in a front view (onto the interface).

The spring cage 15 can be configured to establish a low-resistance electrical connection between the outer conductor contact 9 and the inner conductor contact 10 of the diagnosis assembly 13 when the plug connector 2 is mated with the mating plug connector 3. This allows a simple electrical resistance test or continuity test to be performed between the inner conductor contact 10 and the outer conductor contact 9 from the plug connector 2 to detect whether the plug connector 2 is correctly mated with the mating plug connector 3.

To illustrate the contacting of the spring cage 15 of the diagnosis head 14 with the diagnosis assembly 13 of the plug connector 2, the diagnosis assembly 13 of the plug connector 2 is indicated by dashed lines in FIG. 3. In the connected state, a closed circuit 16 can result. By means of a test signal $i_{test}$ a control unit 17 can check the mated state as part of a diagnosis of the plug-in connection 1.

Figure 6:
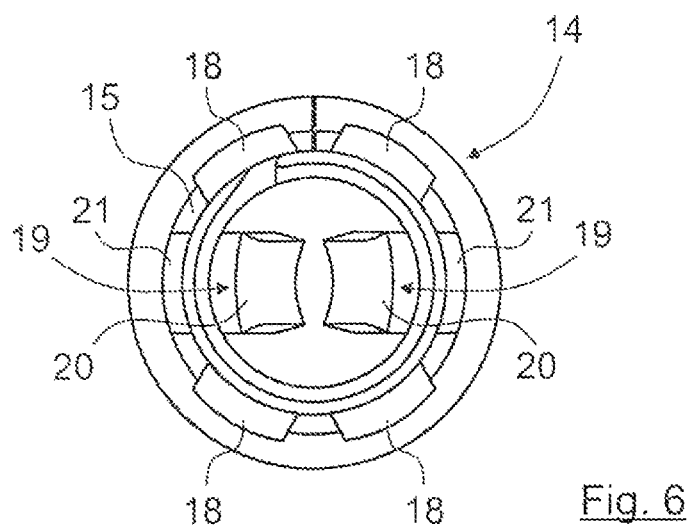
FIG. 6 shows a front view of the diagnosis head according to the invention of FIG. 3.
Figure 7:
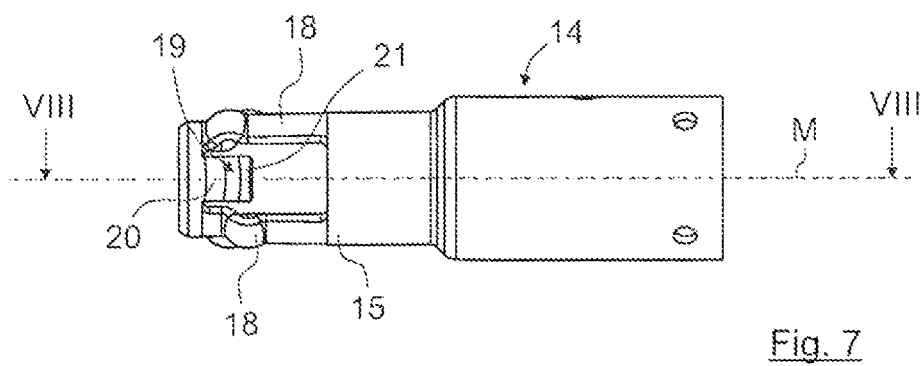
FIG. 7 shows a side view of a diagnosis head according to a second embodiment.
Figure 8:
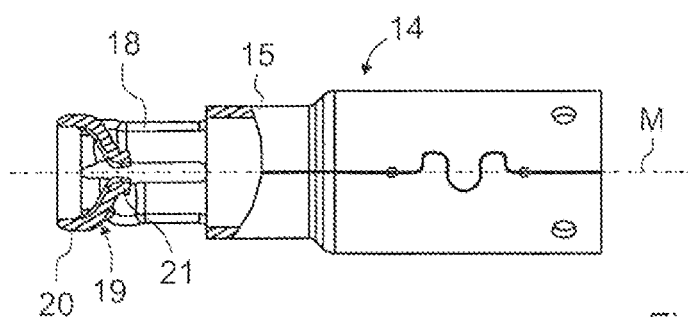
FIG. 8 shows the diagnosis head according to the invention of FIG. 7 in a partially sectional view taken along the line of section VIII of FIG. 7.
Figure 9:
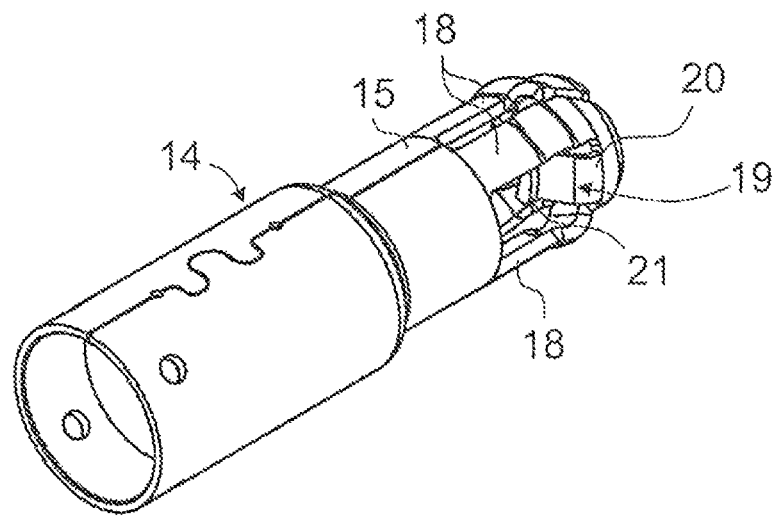
FIG. 9 shows the diagnosis head according to the invention of FIG. 7 in a perspective view.
Figure 10:
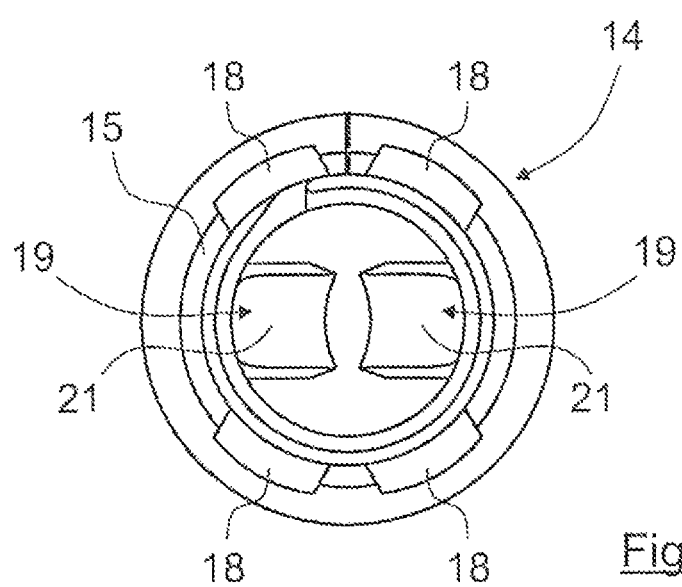
FIG. 10 shows a front view of the diagnosis head according to the invention in FIG. 7.
Figure 11:
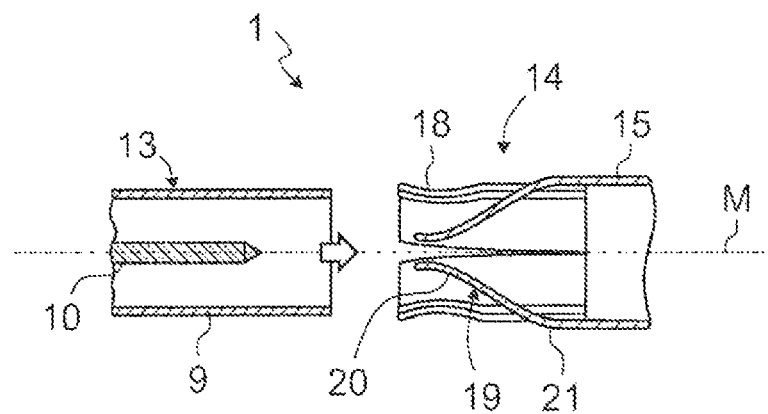
FIG. 11 shows a sectional view of a diagnosis head according to the invention according to a third exemplary embodiment.

As can be seen in particular from FIGS. 3 and 6, the spring cage 15 has a plurality of spring tabs 18, 19 arranged around the center axis M of the diagnosis head 14, each of which spring tabs 18, 19 is connected to the spring cage 15 by at least one end. The spring cage 15 shown by way of example has a total of six spring tabs 18, 19, but can, in principle, have any number of spring tabs 18, 19, for example two to ten spring tabs 18, 19, preferably four to eight spring tabs 18, 19, and very preferably the illustrated six spring tabs 18, 19.

As shown in the exemplary embodiments of FIG. 3 to 11, two groups of spring tabs 18, 19 can be provided, wherein the spring tabs 18 of the first group are designed to contact the outer conductor contact 9 of the diagnosis assembly 13 of the plug connector 2 when the plug connector 2 is mated with the mating plug connector 3 (see in particular FIG. 3). The spring tabs 19 of the second group, on the other hand, are designed to contact the inner conductor contact 10 of the diagnosis assembly 13 of the plug connector 2 when the plug connector 2 is mated with the mating plug connector 3.

In the first exemplary embodiment according to FIG. 3 to 6 and in the second exemplary embodiment according to FIGS. 7 to 10 yet to be described below, the spring tabs 18 of the first group for contacting with the outer conductor contact 9 of the diagnosis assembly 13 of the plug connector 2 are curved outwardly in the region of their front end or have a suitable bulge to contact the inner surface of the cylindrical or annular outer conductor contact 9 of the diagnosis assembly 13 when the plug connector 2 is mated with the mating plug connector 3.

In principle, however, it can also be provided that the spring tabs 18 of the first group for contacting with the outer conductor contact 9 of the diagnosis assembly 13 of the plug connector 2 are curved radially inwards to contact an outer surface of the outer conductor contact 9 of the diagnosis assembly 13 when the plug connector 2 is mated with the mating plug connector 3. A corresponding diagnosis plug-in connection 1, which may be suitable for use with the FAKRA standard, for example, is indicated in a sectional view in FIG. 11. The cylindrical, or annular, outer conductor contact 9 of the diagnosis assembly 13 of the plug connector 2 can be inserted into the spring cage 15.

For contacting the inner conductor contact 10 of the diagnosis assembly 13 of the plug connector 2, the spring tabs 19 of the second group can be curved or bent radially inward toward the center axis M in order to contact the inner conductor contact 10 of the diagnosis assembly 13 when the plug connector 2 is mated with the mating plug connector 3.

According to the first exemplary embodiment (see FIG. 3 to 6) as well as the third exemplary embodiment (see FIG. 11), it can be provided that the front end 20 of each of the spring tabs 19 of the second group is bent radially inwards in the direction of the center axis M of the diagnosis head 14, and wherein the opposite, rear end 21 of the same spring tab 19 is attached to the spring cage 15.

FIGS. 7 to 10 show, by way of example, a second exemplary embodiment which differs from the first exemplary embodiment in particular in that now the rear end 21 of each of the spring tabs 19 of the second group is bent radially inwards in the direction of the center axis M of the diagnosis head 14, and wherein the opposite, front end 20 is attached to the spring cage 15. This variation may be advantageous, if necessary, to facilitate insertion of the inner conductor contact 10 of the diagnosis assembly 13 to avoid damage, if necessary.

In the first three exemplary embodiments, the first group has four spring tabs 18 and the second group has two spring tabs 19, each of which is opposite the other. In principle, however, the number of spring tabs 18, 19 of the individual groups can be arbitrary, wherein at least three spring tabs 18 are generally provided in the first group for easier insertion of the outer conductor contact 9 of the diagnosis assembly 13.

Figure 12:
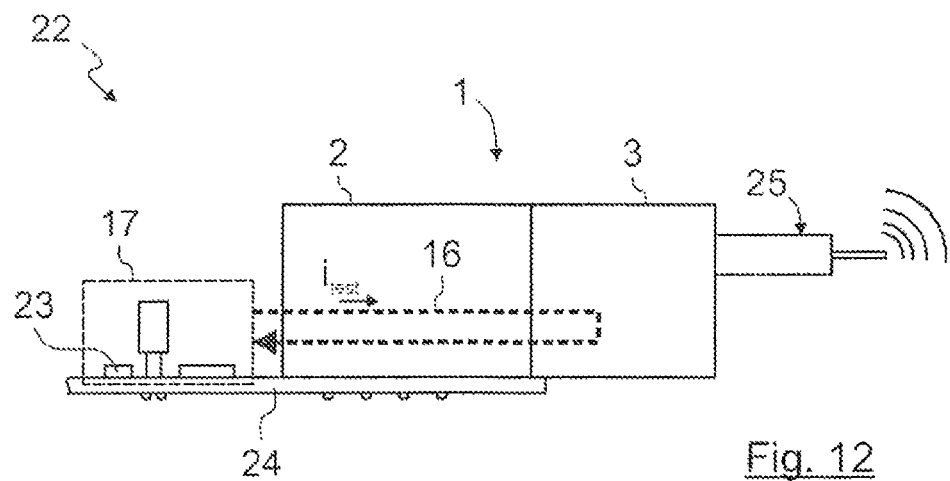
FIG. 12 shows a diagnosis system comprising a control unit and a diagnosis plug-in connection.

FIG. 12 shows a diagnosis system 22, comprising a control unit 17 and a diagnosis plug-in connection 1.

The diagnosis plug-in connection 1 can be designed as described above, for example according to FIGS. 1 and 2.

The control unit 17 can, for example, be designed as a microprocessor and/or other electronic circuit. By way of example, the control unit 17 is shown in FIG. 12 as an electronic circuit comprising a number of electronic components 23 on a printed circuit board 24. The control unit 17 is connected to the plug connector 2 for diagnosis purposes and/or for controlling the data and/or supply signals or for transmitting signals to the mating plug connector 3.

The control unit 17 is configured to perform an electrical continuity test between the outer conductor contact 9 and the inner conductor contact 10 of the diagnosis assembly 13 of the plug connector 2. Provided the diagnosis plug-in connection 1 is correctly closed, the diagnosis head 14 connects the inner conductor contact 10 and the outer conductor contact 9 to each other in accordance with the invention, which can be detected by the control unit 17 by checking the current flow $i_{test}$ using simple means. If the diagnosis plug-in connection 1 is correctly closed, it can also be assumed that the actual signal connections exist between the first signal contact assemblies 7 and the second signal contact assemblies 8.

The diagnosis plug-in connection 1 can be suitable, for example, to form an antenna arrangement. For this purpose, the control unit 17 can, for example, be designed as part of a transmitting and/or receiving unit and can process in a suitable manner received data and/or data to be transmitted. The mating plug connector 3 can, for example, be connected to an antenna via at least one second signal contact assembly 8 or can itself form an antenna by means of a suitably prepared coaxial cable 25 in the outlet of the second signal contact assembly 8 (indicated in FIG. 12).

Figure 13:
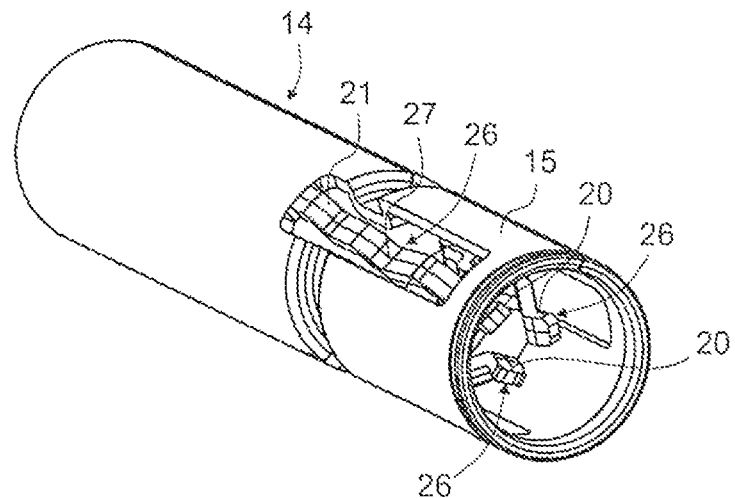
FIG. 13 shows a perspective view of a diagnosis head according to the invention according to a preferred fourth exemplary embodiment.
Figure 14:
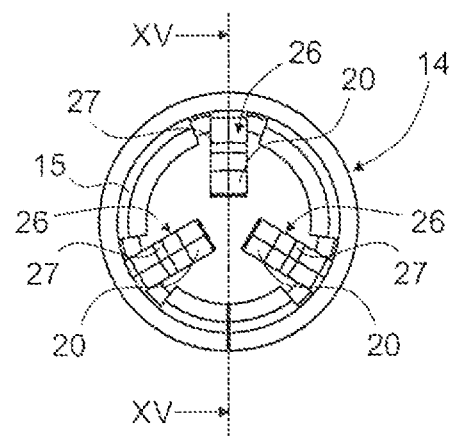
FIG. 14 shows a front view of the diagnosis head according to the invention of FIG. 13.
Figure 15:
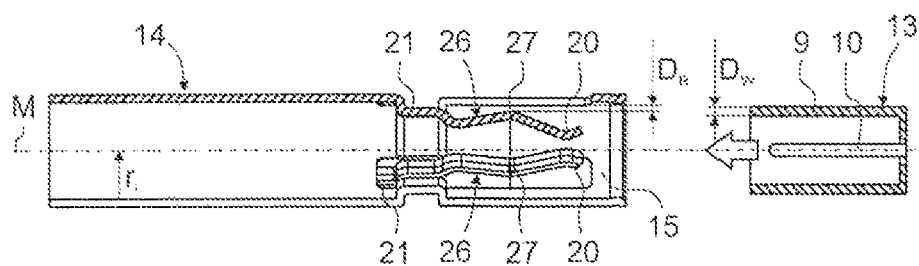
FIG. 15 shows a sectional view of the diagnosis head of the invention according to the invention of FIG. 13 taken along the line of section XV shown in FIG. 14 and a diagnosis assembly of an electrical plug connector.
Figure 16:
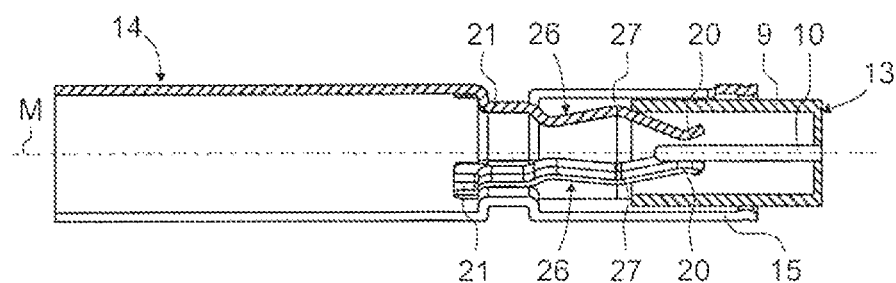
FIG. 16 shows the diagnosis head according to the invention of FIG. 13 according to the view of FIG. 15 during insertion of the diagnosis assembly.
Figure 17:
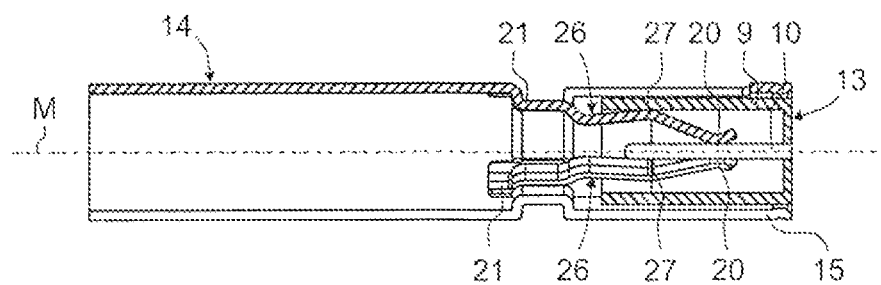
FIG. 17 shows the diagnosis head according to the invention of FIG. 13 according to the view of FIG. 15 after the diagnosis module has been fully inserted.

FIGS. 13 to 17 show a preferred, fourth embodiment of the invention. FIG. 13 shows a perspective view of the diagnosis head 14, which is shown in a front view in FIG. 14. FIGS. 15 to 17 each show a sectional view taken along line of XV of FIG. 14, wherein the process of inserting the corresponding diagnosis assembly 13 of the electrical plug connector 1 is demonstrated schematically.

In principle, the features described in the context of FIGS. 1 to 12 can also be combined with the exemplary embodiment of the invention shown in FIGS. 13 to 17, provided that this is not technically excluded. In principle, the following is explained with respect to the differences from the previous exemplary embodiments.

In the preferred exemplary embodiment of the invention, the spring cage 15 of the diagnosis head 14 has spring tabs 26 which are each designed to simultaneously contact the outer conductor contact 9 and the inner conductor contact 10 of the diagnosis assembly 13 when the plug connector 2 is mated with the mating plug connector 3. The state of contacting in the case of mated plug connector 1 is clearly shown in FIG. 17.

The spring tabs 26 are each immovably attached to the spring cage 15 by means of their rear end 21 facing away from the electrical plug connector 2 and are movable in the direction of the center axis M of the diagnosis head 14 by means of their front end 20 facing the electrical plug connector 2. The spring tabs 26 are further curved radially outwards (toward the spring cage 15) by means of a central contact portion 27, extending between their front end 20 and their rear end 21, when the spring tabs 26 are in a mechanically unloaded state. The central contact portion 27 is provided fundamentally for contacting with the outer conductor contact 9 of the diagnosis assembly 13.

Between the middle contact portion 27 of the spring tabs 26 and the spring cage 15, an intermediate space or gap is provided for insertion of the outer conductor contact 9 of the diagnosis assembly 13. The radial distance $D_R$ (see FIG. 15) between the central contact portion 27 and the inner radius $r_i$ (see FIG. 15) of the spring cage 15 is smaller than a wall thickness $D_W$ (see FIG. 15) of the outer conductor contact 9 of the diagnosis assembly 13 in the mechanically unloaded state of the spring tabs 26 shown in FIGS. 15 and 16. As a result, the insertion of the outer conductor contact 9 can lead to a mechanical load on the spring tabs 26, as can be seen clearly in a comparison of FIGS. 16 and 17. Due to the penetration of the wall of the outer conductor contact 9 into the space between the central contact portion 27 and the spring cage 25, the spring tabs 26 are pressed with their front, free end 20 in the direction of the center axis M of the diagnosis head 14—and thus against the inner conductor contact 10 (see FIG. 17). At the same time, the spring tabs 26 return to their rest position due to their elasticity properties and thus also apply a corresponding insertion force to the outer conductor contact 9.

Preferably, three spring tabs 26 with respect to an embodiment of the invention according to FIGS. 13 to 17 may already be sufficient to ensure an electrically and mechanically stable plug-in connection between the diagnosis assembly 13 and the diagnosis head 14.

OPERATION

Having described and disclosed the structure of our diagnosis plug-In connection, diagnosis head, and diagnosis system its operation is briefly described.

A principal object of the present invention is a diagnosis plug-in connection (1) comprising: an electrical plug connector (2) and having a diagnosis assembly that has an outer conductor contact and an inner conductor contact, and the inner conductor contact is guided within the outer conductor contact; an electrical mating plug connector (3), having a diagnosis head with an electrically conductive spring cage, and the electrically conductive spring cage is designed for electrical and mechanical connection to the outer conductor contact of the diagnosis assembly of the electrical plug connector; and the electrically conductive spring cage electrically and mechanically contacts the inner conductor contact of the diagnosis assembly of the electrical plug connector when the electrical plug connector is mated with the electrical mating plug connector.

A further object of the present invention is a diagnosis plug-in connection (1) and wherein the spring cage (15) provides a low-resistance electrical connection between the outer conductor contact (9) of the diagnosis assembly and the inner conductor contact (10) of the diagnosis assembly (13) when the electrical plug connector (2) is mated with the electrical mating plug connector (3).

A further object of the present invention is a diagnosis plug-in connection (1) and wherein the inner conductor contact (10) of the diagnosis assembly (13) is guided coaxially within the outer conductor contact (9).

A further object of the present invention is a diagnosis plug-in connection (1) and wherein the electrically conductive soring cage (15) Is formed from a punched-and-bent part.

A further object of the present invention is a diagnosis plug-in connection (1) and wherein the electrically conductive soring cage (15) has a plurality of spring tabs (18, 19, 26), and the plurality of spring tabs are arranged around a center axis (M) of the diagnosis head (14), and each of the plurality of spring tabs (18, 19, 26) has a front end (20) and/or a rear end (21) that is immovably attached to the electrically conductive spring cage (15).

A further object of the present invention is a diagnosis plug-in connection (1) and wherein the electrically conductive spring cage (15) has two to ten spring tabs arranged around the center axis (M) of the diagnosis head.

A further object of the present invention is a diagnosis plug-in connection (1) and wherein the plurality of soring tabs (18, 19, 26) are each designed to simultaneously contact the outer conductor contact (9) of the diagnosis assembly and the inner conductor contact (10) of the diagnosis assembly (13) when the electrical plug connector (2) is mated with the electrical mating plug connector (3).

A further object of the present invention is a diagnosis plug-in connection (1) and wherein the plurality of spring tabs (18, 19, 26) are each immovably attached to the electrically conductive soring cage (15) with the rear end (21) of the respective spring tab oriented facing away from the electrical plug connector (2); and the plurality of spring tabs are each movable in the direction of the center axis (M) of the diagnosis head (14) with the respective front end (20) oriented toward the electrical plug connector (2).

A further object of the present invention is a diagnosis plug-in connection (1) and wherein the plurality of spring tabs (26) are each curved radially outwards with a central contact portion (27) extending between the respective front end (20) and the respective rear end (21) in a mechanically unloaded state of the plurality of spring tabs (26).

A further object of the present invention is a diagnosis plug-in connection (1) and wherein a radial distance ($D_R$) between the central contact portion (27) of the plurality of spring tabs (26) and an inner radius ($r_i$) of the soring cage (15) in the mechanically unloaded state of the plurality of spring tabs (26) is smaller than a wall thickness ($D_W$) of the outer conductor contact (9) of the diagnosis assembly (13).

A further object of the present invention is a diagnosis plug-in connection (1) and wherein the plurality of spring tabs (18, 19, 26) and/or the outer conductor contact (9) of the diagnosis assembly (13) are configured so that insertion of the outer conductor contact (9) mechanically loads the plurality of spring tabs (26) so that the plurality of spring tabs (26) are pressed with the respective front end (20) in the direction of the center axis (M) of the diagnosis head (14) against the inner conductor contact (10) of the diagnosis assembly (13) and with the respective central contact portion (27) on the inside and against the outer conductor contact (9).

A further object of the present invention is a diagnosis plug-in connection (1) and further comprising: two groups of soring tabs (18, 19, 26) are provided, and wherein; a first group of spring tabs contact the outer conductor contact (9) of the diagnosis assembly (13) of the electrical plug connector (2) when the electrical plug connector (2) is mated with the electrical mating plug connector (3), and a second group of spring tabs contact the inner conductor contact (10) of the diagnosis assembly (13) of the electrical plug connector (2) when the electrical plug connector (2) is mated with the electrical mating plug connector (3).

A further object of the present invention is a diagnosis plug-in connection (1) and wherein in order to contact the outer conductor contact (9) of the diagnosis assembly (13) of the electrical plug connector (2), the spring tabs (18) of the first group are curved radially outwards at the respective front end, and/or curved radially outwards at the respective rear end and/or curved radially outwards at a central portion extending between the front end and the rear end so as to contact an inner surface of the outer conductor contact (9) of the diagnosis assembly (13) when the electrical plug connector (2) is mated with the electrical mating plug connector (3).

A further object of the present invention is a diagnosis plug-in connection (1) and wherein in order to contact the outer conductor contact (9) of the diagnosis assembly (13) of the electrical plug connector (2), the spring tabs (18) of the first group are curved radially inwards at the respective front end, and/or curved radially inwards at the respective rear end and/or curved radially inwards at a central portion extending between the front end and the rear end so as to contact an outer surface of the outer conductor contact (9) of the diagnosis assembly (13) when the electrical plug connector (2) is mated with the electrical mating plug connector (3).

A further object of the present invention is a diagnosis plug-in connection (1) and wherein the spring tabs of the second group of spring tabs are curved radially inwardly at the respective front end, and/or are curved radially inwardly at the respective rear end, and/or are curved radially inwardly at a central portion of the respective soring tab extending between the front end and the rear end for contacting the inner conductor contact (10) of the diagnosis assembly (13) of the electrical plug connector (2) when the electrical plug connector (2) is mated with the electrical mating plug connector (3).

A further object of the present invention is a diagnosis plug-in connection (1) and wherein the front end (20) or the rear end (21) of each of the spring tabs (19) of the second group of spring tabs is bent radially inwards in the direction of the center axis (M) of the diagnosis head (14), and wherein an opposite end (20, 21) of each soring tab (19) is connected to the spring cage (15).

A further object of the present invention is a diagnosis plug-in connection (1) and wherein the spring tabs of the first group of soring tabs comprises at least three, spring tabs (18).

A further object of the present invention is a diagnosis plug-in connection and wherein the soring tabs of the second group of spring tabs comprises at least two spring tabs.

A further object of the present invention is a diagnosis plug-in connection and further comprising: a first signal contact assembly (7) of the electrical plug connector, the first contact assembly having an outer conductor contact (9) and an inner conductor contact (10), and the inner conductor contact is guided within the outer conductor contact (9); and wherein the electrical mating plug connector (3) has a second signal contact assembly (8) that has an outer conductor soring cage (11) and an inner conductor contact element (12), and the inner conductor contact element is guided within the outer conductor spring cage (11); and the first signal contact assembly (7) and the second signal contact assembly (8) can be mated with each other for electrical and mechanical contacting.

A further object of the present invention is a diagnosis plug-in connection (1) and wherein the electrical plug connector (2) has plural first signal contact assemblies (7) and/or the electrical mating plug connector (3) has plural second signal contact assemblies (8).

A further object of the present invention is a diagnosis plug-in connection (1) and further comprising: a first outer housing shell (4) of the electrical plug connector; and a second outer housing shell (6) of the electrical mating plug connector; and contact chambers (5) are defined in the first outer housing shell and in the second outer housing shell for receiving the diagnosis assembly (13), and/or receiving the diagnosis head (14) and/or receiving the signal contact assemblies (7, 8).

A further object of the present invention is a mating plug connector (3) for connection to a plug connector (2), the mating plug connector comprising: a diagnosis head (14) that has an electrically conductive soring cage (15) for electrical and mechanical connection to an outer conductor contact (9) of a diagnosis assembly (13) of the plug connector (2); and the electrically conductive soring cage (15) electrically and mechanically contacts an inner conductor contact (10), and the inner conductor contact is guided within the outer conductor contact (9), of the diagnosis assembly (13) of the plug connector (2) when the plug connector (2) is mated with the mating plug connector (3).

A further object of the present invention is a method for producing a diagnosis head (14) for an electrical mating plug connector of a diagnosis plug-in connection (1), comprising the steps: forming a spring cage by stamping the soring cage out of a metal sheet, and shaping the stamped spring cage into an annularly shaped spring cage, and the annularly shaped spring cage defines a center axis (M); providing at least one soring tab, and the at least one soring tab has a front end, and a rear end, and the front end or the rear end of the at least one soring tab is separated from the annularly shaped spring cage either before or after the shaping of the annularly she spring cage; bending the at least one spring tab toward the center axis (M) of the annularly shaped spring cage such that it is possible for the at least one spring tab to conductively connect an outer conductor contact and an inner conductor contact of a diagnosis assembly of an electrical plug connector to each other when the electrical plug connector is mated with an electrical mating plug connector having said diagnoses head.

A still further object of the present invention is a diagnosis system (22), comprising: a control unit (17); and a diagnosis plug-in connection (1), wherein the diagnosis plug-in connection (1) comprises an electrical plug connector, (2) and an electrical mating plug connector (3), and wherein the electrical plug connector (2) has a diagnosis assembly (13) that has an outer conductor contact (9) and an inner conductor contact (10), and the inner conductor contact is guided within the outer conductor contact (9); and wherein the electrical mating plug connector (3) has a diagnosis head (14) that has an electrically conductive spring cage (15) for electrical and mechanical connection to the outer conductor contact (9) of the diagnosis assembly (13) of the electrical plug connector (2); and wherein the control unit (17) is configured to perform an electrical continuity test between the outer conductor contact (9) and the inner conductor contact (10); and the electrically conductive spring cage (15) of the diagnosis head (14) is configured to electrically and mechanically contact the inner conductor contact (10) of the diagnosis assembly (13) of the electrical plug connector (2) when the electrical plug connector (2) is mated with the electrical mating plug connector (3).

An even still further object of the present invention is a method for diagnosing an electrical plug-in connection (1) comprising the steps: providing an electrical plug connector (2), the electrical plug connector having a diagnosis assembly that has an outer conductor contact and an inner conductor contact, and the inner conductor contact is inside the outer conductor contact; and providing an electrical mating plug connector (3), the electrical mating plug connector having a diagnosis head with an electrically conductive soring cage; and performing an electrical continuity test is performed between the outer conductor contact (9) and the inner conductor contact (10) of the diagnosis assembly (13) of the electrical plug connector (2) to detect whether the electrical plug connector (1) is in a closed condition; and wherein the outer conductor contact (9) and the inner conductor contact (10) of the diagnosis assembly (13) of the electrical plug connector (2) are electrically conductively connected to each other via the electrically conductive soring cage (15) of the diagnosis head (14) of the electrical mating plug connector (3) when the electrical plug connector (2) is mated with the electrical mating plug connector (3).

In compliance with the statute, the present invention has been described in language more or less specific, as to structural, methodical and operational features, it is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:
1. A diagnosis plug-in connection comprising:
an electrical plug connector having a diagnosis assembly that has an outer conductor contact and an inner conductor contact, and the inner conductor contact is guided within the outer conductor contact;
an electrical mating plug connector having a diagnosis head with an electrically conductive spring cage, and the electrically conductive spring cage is designed for electrical and mechanical connection to the outer conductor contact of the diagnosis assembly of the electrical plug connector; and
the electrically conductive spring cage electrically and mechanically contacts the inner conductor contact of the diagnosis assembly of the electrical plug connector when the electrical plug connector is mated with the electrical mating plug connector.
2. The diagnosis plug-in connection as claimed in claim 1 and wherein the spring cage provides a low-resistance electrical connection between the outer conductor contact of the diagnosis assembly and the inner conductor contact of the diagnosis assembly when the electrical plug connector is mated with the electrical mating plug connector.

3. The diagnosis plug-in connection as claimed in claim 1 and wherein the inner conductor contact of the diagnosis assembly is guided coaxially within the outer conductor contact.

4. The diagnosis plug-in connection as claimed in claim 1 and wherein the electrically conductive spring cage is formed from a punched-and-bent part.

5. The diagnosis plug-in connection as claimed in claim 1 and wherein the electrically conductive spring cage has a plurality of spring tabs, and the plurality of spring tabs are arranged around a center axis (M) of the diagnosis head and each of the plurality of spring tabs has a front end and/or a rear end that is immovably attached to the electrically conductive spring cage.

6. The diagnosis plug-in connection as claimed in claim 5 and wherein the electrically conductive spring cage has two to ten spring tabs arranged around the center axis (M) of the diagnosis head.

7. The diagnosis plug-in connection as claimed in claim 5 and wherein the plurality of spring tabs are each designed to simultaneously contact the outer conductor contact of the diagnosis assembly and the inner conductor contact of the diagnosis assembly when the electrical plug connector is mated with the electrical mating plug connector.

8. The diagnosis plug-in connection as claimed in claim 5 and wherein the plurality of spring tabs are each immovably attached to the electrically conductive spring cage with the rear end of the respective spring tab oriented away from the electrical plug connector; and
the plurality of spring tabs are each movable in the direction of the center axis (M) of the diagnosis head with the respective front end oriented toward the electrical plug connector.

9. The diagnosis plug-in connection as claimed in claim 5 and wherein the plurality of spring tabs are each curved radially outwards with a central contact portion extending between the respective front end and the respective rear end in a mechanically unloaded state of the plurality of spring tabs.

10. The diagnosis plug-in connection as claimed in claim 9 and wherein a radial distance ($D_R$) between the central contact portion of the plurality of spring tabs and an inner radius ($r_i$) of the spring cage in the mechanically unloaded state of the plurality of spring tabs is smaller than a wall thickness ($D_W$) of the outer conductor contact of the diagnosis assembly.

11. The diagnosis plug-In connection as claimed in claim 9 and wherein the plurality of spring tabs and/or the outer conductor contact of the diagnosis assembly are configured so that insertion of the outer conductor contact mechanically loads the plurality of-spring tabs so that the plurality of spring tabs are pressed with the respective front end in the direction of the center axis (M) of the diagnosis head against the inner conductor contact of the diagnosis assembly and with the respective central contact portion on the inside and against the outer conductor contact.

12. The diagnosis plug-in connection as claimed in claim 5 and further comprising:
two groups of spring tabs are provided, and wherein;
a first group of spring tabs contact the outer conductor contact of the diagnosis assembly of the electrical plug connector when the electrical plug connector is mated with the electrical mating plug connector, and
a second group of spring tabs contact the inner conductor contact of the diagnosis assembly of the electrical plug connector when the electrical plug connector is mated with the electrical mating plug connector.

13. The diagnosis plug-in connection as claimed in claim 12, and wherein in order to contact the outer conductor contact of the diagnosis assembly of the electrical plug connector the spring tabs of the first group are curved radially outwards at the respective front end, and/or curved radially outwards at the respective rear end and/or curved radially outwards at a central portion extending between the front end and the rear end so as to contact an inner surface of the outer conductor contact of the diagnosis assembly when the electrical plug connector is mated with the electrical mating plug connector.

14. The diagnosis plug-In connection as claimed in claim 12, and wherein in order to contact the outer conductor contact of the diagnosis assembly of the electrical plug connector the spring tabs of the first group are curved radially inwards at the respective front end, and/or curved radially inwards at the respective rear end and/or curved radially inwards at a central portion extending between the front end and the rear end so as to contact an outer surface of the outer conductor contact of the diagnosis assembly when the electrical plug connector is mated with the electrical mating plug connector.

15. The diagnosis plug-in connection as claimed in claim 12 and wherein the spring tabs of the second group of spring tabs are curved radially inwardly at the respective front end, and/or are curved radially inwardly at the respective rear end, and/or are curved radially inwardly at a central portion of the respective spring tab extending between the front end and the rear end for contacting the inner conductor contact of the diagnosis assembly of the electrical plug connector when the electrical plug connector is mated with the electrical mating plug connector.

16. The diagnosis plug-In connection as claimed in claim 15 and wherein the front end or the rear end of each of the spring tabs of the second group of spring tabs is bent radially inwards in the direction of the center axis (M) of the diagnosis head, and wherein
an opposite end of each spring tab is connected to the spring cage.

17. The diagnosis plug-in connection as claimed in claim 12 and wherein the spring tabs of the first group of spring tabs comprises at least three spring tabs.

18. The diagnosis plug-in connection as claimed in claim 12 and wherein the spring tabs of the second group of spring tabs comprises at least two spring tabs.

19. The diagnosis plug-in connection as claimed in claim 1 and further comprising:
a first signal contact assembly of the electrical plug connector, the first contact assembly having an outer conductor contact and an inner conductor contact, and the inner conductor contact is guided within the outer conductor contact; and wherein
the electrical mating plug connector has a second signal contact assembly that has an outer conductor spring cage and an inner conductor contact element, and the inner conductor contact element is guided within the outer conductor spring cage; and
the first signal contact assembly and the second signal contact assembly can be mated with each other for electrical and mechanical contacting.

20. The diagnosis plug-in connection as claimed in claim 19, and wherein the electrical plug connector has plural first signal contact assemblies and/or the electrical mating plug connector has plural second signal contact assemblies.

21. The diagnosis plug-in connection as claimed in claim 19 and further comprising:
- a first outer housing shell of the electrical plug connector; and
- a second outer housing shell of the electrical mating plug connector; and
- contact chambers are defined in the first outer housing shell and in the second outer housing shell for receiving the diagnosis assembly, and/or receiving the diagnosis head and/or receiving the signal contact assemblies.

22. A mating plug connector for connection to a plug connector, the mating plug connector comprising:
- a diagnosis head that has an electrically conductive spring cage for electrical and mechanical connection to an outer conductor contact of a diagnosis assembly of the plug connector; and wherein
- the electrically conductive spring cage has a plurality of spring tabs, and the plurality of spring tabs are arranged around a center axis (M) of the diagnosis head and each of the plurality of soring tabs has a front end and/or a rear end that is immovably attached to the electrically conductive spring cage; and wherein
- the plurality of spring tabs are each designed to simultaneously contact the outer conductor contact of the diagnosis assembly and the inner conductor contact of the diagnosis assembly; and
- the electrically conductive spring cage electrically and mechanically contacts an inner conductor contact, and the inner conductor contact is guided within the outer conductor contact, of the diagnosis assembly of the plug connector when the plug connector is mated with the mating plug connector.

23. A diagnosis system comprising:
- a control unit; and
- a diagnosis plug-in connection, wherein the diagnosis plug-in connection comprises an electrical plug connector, and an electrical mating plug connector, and wherein the electrical plug connector has a diagnosis assembly that has an outer conductor contact and an inner conductor contact, and the inner conductor contact is guided within the outer conductor contact; and wherein
- the electrical mating plug connector has a diagnosis head that has an electrically conductive spring cage for electrical and mechanical connection to the outer conductor contact of the diagnosis assembly of the electrical plug connector; and wherein
- the control unit is configured to perform an electrical continuity test between the outer conductor contact and the inner conductor contact; and
- the electrically conductive spring cage of the diagnosis head is configured to electrically and mechanically contact the inner conductor contact of the diagnosis assembly of the electrical plug connector when the electrical plug connector is mated with the electrical mating plug connector.

24. A method for diagnosing an electrical plug-In connection comprising the steps:
- providing an electrical plug connector, the electrical plug connector having a diagnosis assembly that has an outer conductor contact and an inner conductor contact, and the inner conductor contact is inside the outer conductor contact; and
- providing an electrical mating plug connector, the electrical mating plug connector having a diagnosis head with an electrically conductive spring cage; and
- performing an electrical continuity test between the outer conductor contact and the inner conductor contact of the diagnosis assembly of the electrical plug connector to detect whether the electrical plug connector is in a closed condition; and wherein
- the outer conductor contact and the inner conductor contact of the diagnosis assembly of the electrical plug connector are electrically conductively connected to each other via the electrically conductive spring cage of the diagnosis head of the electrical mating plug connector when the electrical plug connector is mated with the electrical mating plug connector.

* * * * *